US010222647B2

(12) United States Patent
Hai

(10) Patent No.: US 10,222,647 B2
(45) Date of Patent: Mar. 5, 2019

(54) LIQUID CRYSTAL DISPLAY PANEL AND A LIQUID CRYSTAL DISPLAY

(71) Applicant: Shenzhen China Star Optoelectronics Technology Co., Ltd., Shenzhen, Guangdong (CN)

(72) Inventor: Bo Hai, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 103 days.

(21) Appl. No.: 15/502,270

(22) PCT Filed: Jan. 13, 2017

(86) PCT No.: PCT/CN2017/071160
§ 371 (c)(1),
(2) Date: Feb. 7, 2017

(87) PCT Pub. No.: WO2018/120307
PCT Pub. Date: Jul. 5, 2018

(65) Prior Publication Data
US 2018/0210286 A1    Jul. 26, 2018

(30) Foreign Application Priority Data
Dec. 28, 2016  (CN) .......................... 2016 1 1233663

(51) Int. Cl.
*G02F 1/1335* (2006.01)
*G02F 1/1362* (2006.01)

(52) U.S. Cl.
CPC .. *G02F 1/133528* (2013.01); *G02F 1/133502* (2013.01); *G02F 1/133514* (2013.01);
(Continued)

(58) Field of Classification Search
CPC ......... G02F 1/133528; G02F 1/133502; G02F 1/133514; G02F 1/133628
See application file for complete search history.

(56) References Cited

U.S. PATENT DOCUMENTS 4,747,674 A *  5/1988  Butterfield ........... G02B 5/3033
                                                    359/487.02
6,555,955 B1 *  4/2003  Honda .............. G02F 1/133514
                                                         313/479
(Continued)

FOREIGN PATENT DOCUMENTS

CN        105093654 A     11/2015
CN        106057830 A     10/2016
(Continued)

*Primary Examiner* — Hoan C Nguyen
(74) *Attorney, Agent, or Firm* — Andrew C. Cheng

(57) ABSTRACT

The present application discloses a liquid crystal display panel, comprising an antireflective film, a front polarizer, an array substrate, a liquid crystal layer, a color filter substrate, and a rear polarizer disposed sequentially, a metal trace is disposed on the array substrate, and the antireflective film completely covers the metal trace. The antireflection film is provided on one side of the array substrate away from the color filter substrate in the present application, whereby the reflected light formed on the antireflective film and the reflected light formed by the front polarizer having the interference offsetting action to reduce the reflecting light on the liquid crystal display, thereby increasing the contrast of the liquid crystal display panel and improving the display quality of the image. The frame of the liquid crystal display of the present application can be further narrow and has a high contrast.

18 Claims, 2 Drawing Sheets

(52) U.S. Cl.
CPC .. *G02F 1/136286* (2013.01); *G02F 1/133553* (2013.01); *G02F 1/133555* (2013.01); *G02F 2001/136222* (2013.01); *G02F 2001/136295* (2013.01)

(56) References Cited

U.S. PATENT DOCUMENTS

| | | | |
|---|---|---|---|
| 2003/0007341 A1* | 1/2003 | Shimamura | H01J 5/08 361/816 |
| 2004/0263720 A1 | 12/2004 | Wang | |
| 2005/0237452 A1* | 10/2005 | Kojima | G02F 1/133385 349/113 |
| 2012/0285527 A1* | 11/2012 | Goldblatt | H01L 31/02243 136/256 |
| 2016/0162080 A1* | 6/2016 | Hayashi | G06F 3/045 345/173 |

FOREIGN PATENT DOCUMENTS

| | | | | |
|---|---|---|---|---|
| JP | 09127500 A | * | 5/1997 | |
| JP | 2000162597 A | | 6/2000 | |
| JP | 2013222123 A | * | 10/2013 | H05K 3/061 |
| WO | 2006019086 A1 | | 2/2006 | |

* cited by examiner

LIQUID CRYSTAL DISPLAY PANEL AND A LIQUID CRYSTAL DISPLAY

CROSS REFERENCE

This application claims priority to Chinese Patent Application No. 201611233663.3, entitled "Liquid crystal display panel and a liquid crystal display", filed on Dec. 28, 2016, which is incorporated by reference in its entirety.

FIELD OF THE INVENTION

The present application relates to a display technology field, and more particularly to narrow frame liquid crystal display panel and liquid crystal display.

BACKGROUND OF THE INVENTION

With the rapid development of liquid crystal display technology, to provide thinner, narrower frame liquid crystal display device has become the industry development trend. Due to the limitation of the thickness and appearance of the display, if we want to realize the ultra-thin and ultra-narrow frame design, re-positioning of its components to optimize the structure design is needed and to make the structure more compact.

Referring to FIG. 1, the liquid crystal display panel in the conventional technology includes an array substrate 11, a liquid crystal layer 12, and a color filter substrate 13 which are arranged in this order from the top to the bottom. A Gate On Array, GOA technique is usually adopted in the frameless liquid crystal display structure, and the Chip On Film, COF structure 14 of gate on the short side of the array substrate 11 of a liquid crystal display panel is generally omitted, but the COF structure 14 of source on the long side of the array substrate cannot be eliminated. Since the size of the color filter substrate 11 is smaller than that of the array substrate 13, the color filter substrate 13 cannot cover the COF structure 14 of source on the array substrate 11, and an additional shielding structure is required for blocking processing, so that the long side of the liquid crystal display cannot achieve narrow frame design.

If the array substrate 13 is disposed above the color filter substrate 11, the array substrate 11 can completely cover the bended COF structure 14 of source to eliminate the need for an additional shielding structure, thereby further achieving a narrow frame design of the liquid crystal display. However, since a plurality of metal lines is provided on the array substrate, when the array substrate 13 is facing upward and the color filter substrate 11 is facing downward, the metal lines in the array substrate 11 are not shielded by the black matrix on the color filter substrate 13, and the reflection effect of the array substrate is enhanced to lower the contrast of the liquid crystal display. When viewing the liquid crystal display under strong light, it is not possible to see the image with low light, which degrades the quality of the image.

SUMMARY OF THE INVENTION

An object of the present application is to provide a liquid crystal display panel capable of further narrowing the frame of a liquid crystal display without affecting its display contrast.

Another object of the present application is to provide a liquid crystal display using the above liquid crystal display panel.

In order to achieve the above-mentioned object, the present application provides the following technical solutions:

The present application provides a liquid crystal display panel, including an antireflective film, a front polarizer, an array substrate, a liquid crystal layer, a color filter substrate, and a rear polarizer disposed sequentially, a metal trace is disposed on the array substrate, and the antireflective film completely covers the metal trace.

Wherein Magnesium Fluoride is selected as the material of the antireflective film.

Wherein Aluminum is used as the material of the metal trace, and the thickness of the antireflective film is 90.6~108.7 nm.

Wherein the thickness of the antireflective film is 97.8~101.4 nm.

Wherein Copper is used as the material of the metal trace, and the thickness of the antireflective film is 99.6~117.8 nm.

Wherein the thickness of the antireflective film is 105.1~108.7 nm.

Wherein the antireflective film completely covers surface of the array substrate.

Wherein further including a COF structure of source, the COF structure of source is connected to the surface of the array substrate close to the liquid crystal layer, and the projection of the COF structure of source on the array substrate is within the array substrate.

Wherein one end of the COF structure of source is connected to the array substrate, and the COF structure of source is bent away from the direction of the array substrate to make the projection of the COF structure of source on the array substrate is within the array substrate.

The present application further provides a liquid crystal display including a backlight module and a liquid crystal display panel, the backlight module is disposed closed to the side of the liquid crystal display panel on which the color filter substrate is provided, the liquid crystal display panel including an antireflective film, a front polarizer, an array substrate, a liquid crystal layer, a color filter substrate, and a rear polarizer disposed sequentially, a metal trace is disposed on the array substrate, and the antireflective film completely covers the metal trace.

Wherein Magnesium Fluoride is selected as the material of the antireflective film.

Wherein Aluminum is used as the material of the metal trace, and the thickness of the antireflective film is 90.6~108.7 nm.

Wherein the thickness of the antireflective film is 97.8~101.4 nm.

Wherein Copper is used as the material of the metal trace, and the thickness of the antireflective film is 99.6~117.8 nm.

Wherein the thickness of the antireflective film is 105.1~108.7 nm.

Wherein the antireflective film completely covers surface of the array substrate.

Wherein further including a COF structure of source, the COF structure of source is connected to the surface of the array substrate close to the liquid crystal layer, and the projection of the COF structure of source on the array substrate is within the array substrate.

Wherein one end of the COF structure of source is connected to the array substrate, and the COF structure of source is bent away from the direction of the array substrate to make the projection of the COF structure of source on the array substrate is within the array substrate.

The embodiments of the present application have the following advantages or benefits:

In the present application, the array substrate is disposed over the color filter substrate, and the antireflection film is provided on one side of the array substrate away from the color filter substrate, whereby the reflected light formed on the antireflective film and the reflected light formed by the front polarizer passes through the interference canceling action reduces the reflected light from the front polarizer on the array substrate, thereby increasing the contrast of the liquid crystal display panel and improving the display quality of the image. The frame of the liquid crystal display of the present application can be further narrow and has a high contrast.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts acquired should be considered within the scope of protection of the present application.

Specifically, the terminologies in the embodiments of the present application are merely for describing the purpose of the certain embodiment, but not to limit the invention. Embodiments and the claims be implemented in the present application requires the use of the singular form of the book "an", "the" and "the" are intend to include most forms unless the context clearly dictates otherwise. It should also be understood that the terminology used herein that "and/or" means and includes any or all possible combinations of one or more of the associated listed items.

Figure 1:
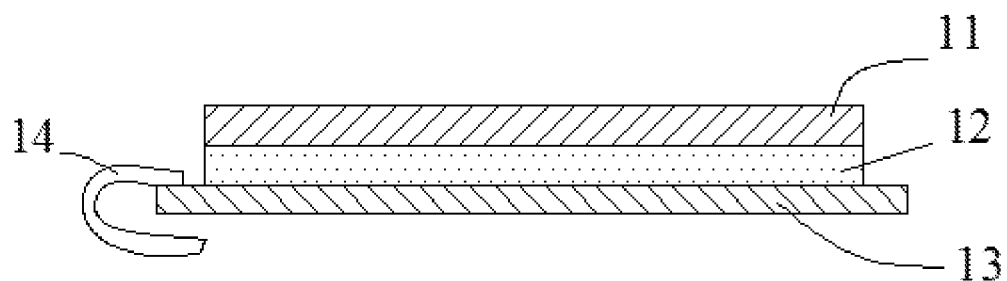
FIG. 1 is a schematic view of a conventional liquid crystal display panel.
Figure 2:
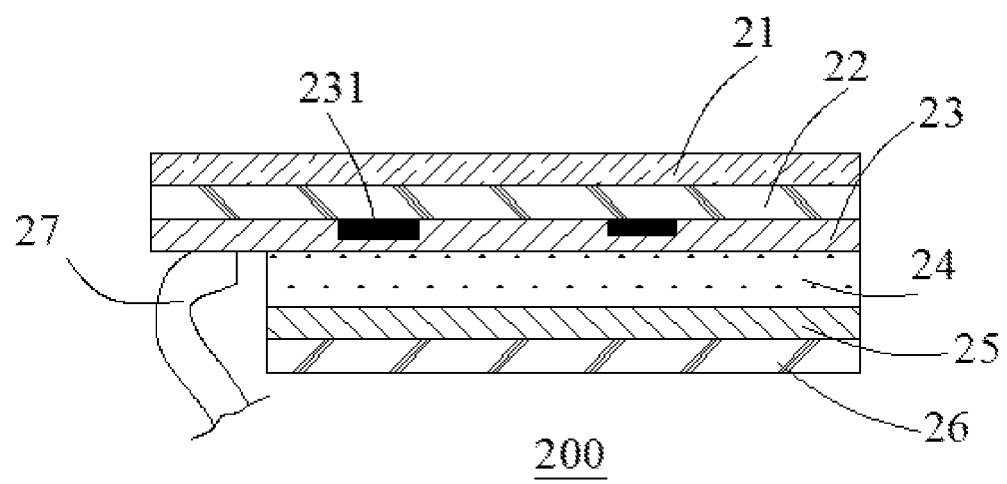
FIG. 2 is a schematic diagram of a liquid crystal display panel according to an embodiment of the present application.

Referring FIG. 2, FIG. 2 is a schematic diagram of a liquid crystal display panel according to an embodiment of the present application. The liquid crystal display panel 200 includes an antireflective film 21, a front polarizer 22, an array substrate 23, a liquid crystal layer 24, a color filter substrate 25, and a rear polarizer 26. The liquid crystal layer 24 is sandwiched between the array substrate 23 and the color filter substrate 25. The array substrate 23 is disposed above the color filter substrate 25, that is the color filter substrate 25 is provided on the light incident side of the liquid crystal layer 24, the array substrate 23 is provided on the light exiting surface of the color filter substrate 25. The front polarizer 22 is disposed on a surface of the color filter substrate 25 away from the liquid crystal layer 24, the rear polarizer 26 is provided on a surface of the color filter substrate 25 away from the liquid crystal layer 24. The antireflective film 21 is attached to the surface of the front polarizer 22 away from the array substrate 23.

Further, more specifically, a metal traces 231 is provided on the array substrate 23, a COF structure 27 of source is connected to the surface of the array substrate 23 closed to the liquid crystal layer 24. Specifically, one end of the COF structure 27 of source is connected to the array substrate 23, and the other end of the COF structure 27 of source is bent away from the direction of the array substrate 23, so that the projection of the COF structure 27 of source on the array substrate 23 is within the array substrate 23. The COF structure 27 of source is used to connect a printed circuit board, PCB to provide a source signal for the array substrate 23. The antireflective film 21 completely covers the metal traces 231. In other words, the forward projection of the metal trace 231 on the antireflective film 21 is within the antireflective film 21. The function of the antireflective film 21 is, The reflected light formed on the antireflective film 21 and the reflected light formed on the front polarizer 22 are canceled by the interference of light, to reduce the reflected light of the liquid crystal display panel 200, thereby offsetting the increased reflecting light from the metal traces 231 caused by the array substrate 23 facing upward, thereby increasing the contrast of the liquid crystal display panel 200 and improving the display quality of the image. Preferably, the projection of the array substrate 23 onto the antireflective film 21 is within the array substrate 23.

It can be understood that the refractive index of air is n1=1, and the refractive index n3 of the material of the front polarizer 22, the array substrate 23, etc. is approximately 1.52. It is ensured that the energy of the reflected light from the surface of the antireflective film 21 and the energy of the reflected light from the surface of the front polarizer 22 are equal to each other so that the energy of the reflected light is minimum. That is, the refractive index n2 of the antireflective film 21 should satisfy $n2=\sqrt{n1*n3}=1.23$. The material can be selected is limited, due to the material with the refractive index is 1.23. In order to reduce the production cost, Magnesium Fluoride (chemical formula: MgF2, refractive index: 1.38) which the refractive index is relatively closed to can be selected as the material of the antireflective film 21 so as to ensure a higher display panel contrast and the manufacturing cost of the display panel 200 is reduced. According to the calculation formula $R=(n1-n2)2/(n1+n2)2$ of the reflectance, it can be seen that the reflectance of Magnesium Fluoride as the antireflection layer is about 2%. The reflected light from the surface of the liquid crystal display panel 200, and the reflected light from the surface of the liquid crystal display panel 200 can be sufficiently reduced.

Further and more specifically, the material of the metal trace 231 in the array substrate 23 can be made of Aluminum or Copper. In other embodiments of the present application, the metal traces 231 can also utilize other metallic materials.

When the reflected light on the surface of the antireflection film 21 and the reflected light on the surface of the front polarizer 22 interfere with each other and cancelled, the contrast of the liquid crystal display panel 200 is the highest, and the display effect is the best. It can be understood that $e=\lambda/4n$ is satisfied at this time, wherein e is the thickness of the antireflection film 21, $\lambda$ is the wavelength of the incident light, and n is the reflectance of the antireflective film 21.

Figure 3:
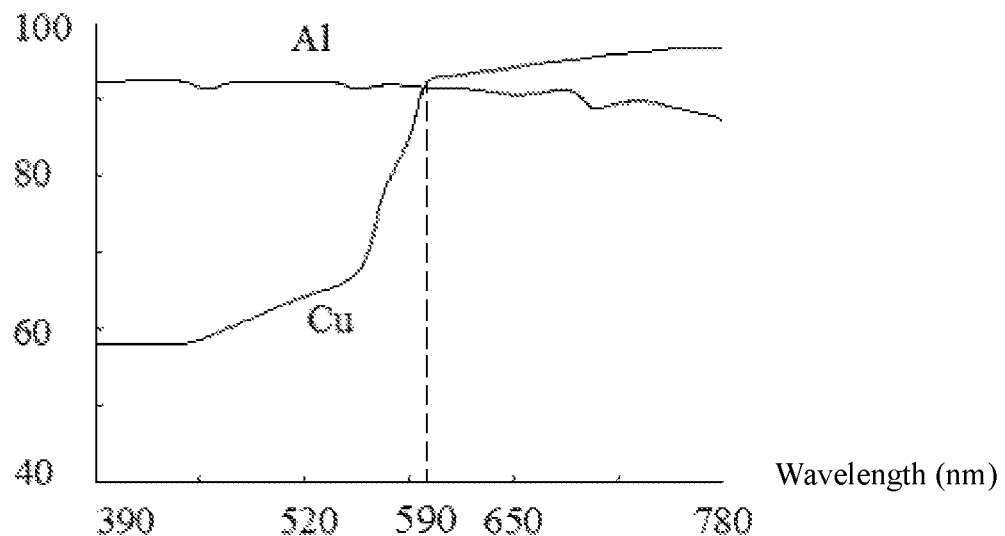
FIG. 3 is the reflectivity of the Aluminum and Copper under different wavelengths of light.

Referring to FIG. 3, FIG. 3 is the reflectivity of the Aluminum and Copper under different wavelengths of light. As it can be seen from FIG. 3, for Aluminum, the reflectivity is about 90% in the whole band on the visible light. In addition, human eye is more sensitive to the reaction of the green light; it is possible to design the antireflective film 21 for the wavelength band close to the green light with the wavelength between 500 and 600 nm when Aluminum is used as the material of the metal trace 231. The thickness of the antireflective film 21 is e=λ/4n (500 nm≤λ≤600 nm, the material of the antireflective film 21 is Magnesium Fluoride, n=1.38). The thickness e of the antireflective film 21 satisfies 90.6 nm≤E≤108.7 nm. Preferably, the green light having wavelengths between 540 and 560 nm can be treated with the antireflective film 21, since human eye is most sensitive to the light rays in that band. In this case, the thickness e of the antireflective film 21 satisfies 97.8 nm≤E≤101.4 nm.

For Copper, Copper has low reflective in the blue band and has high reflective in the red-green band, so the Copper is yellow. Therefore, it is possible to design the antireflective film 21 for closed to-yellow light having a wavelength between 550 and 650 nm, thereby offsetting the increased reflected light due to the Copper metal. Similarly, according to the thickness of the antireflective film 21, the equation is e=λ/4n. Wherein λ=550 to 650 nm and n=1.38. In this case, the thickness e of the antireflection film 21 satisfies 99.6 nm≤e≤117.8 nm. Further, as illustrated in FIG. 3, the turning point of the reflectance of Copper metal to visible light is approximately 590 nm. So that it is possible to design the antireflective film 21 for the yellow light with wavelength between 580-600 nm. That is, it is preferable that the thickness e of the antireflection film 21 satisfies 105.1 nm≤e≤108.7 nm.

It can be understood that, in other embodiments of the present application, the antireflective film 21 can also be made of other materials. For example, a material having a refractive index of 1.23 can be used. At this time the anti-reflection effect is best. In addition, when the metal trace 231 is made of an Aluminum material, the thickness e of the antireflective film 21 satisfies e=λ/4n, wherein 500 nm≤λ≤600 nm and n=1.23, that is, 101.6 nm≤e≤122 nm. Preferably, when 540 nm≤λ≤560 nm, e is 109.8 nm≤e≤113.8 nm.

When the metal trace 231 is made of Copper material, the thickness e of the antireflective film 21 satisfies e=λ/4n, wherein 550 nm≤λ≤650 nm, and n=1.23, that is, 111.8 nm≤e≤132.1 nm. Preferably, when 580 nm≤λ≤600 nm, e is 117.9 nm≤e≤122 nm.

Figure 4:
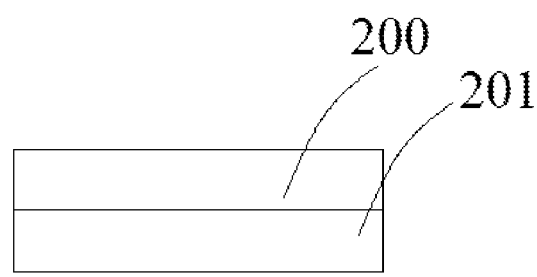
FIG. 4 is a schematic diagram of a liquid crystal display according to an embodiment of the present application.

Referring to FIG. 4, FIG. 4 is a schematic view of a liquid crystal display according to an embodiment of the present application. The liquid crystal display 500 includes a backlight module 201 and a liquid crystal display panel 200. The liquid crystal display panel 200 is the liquid crystal display panel 200 described in any one of the above embodiments. Specifically, the backlight module 201 and the liquid crystal display panel 200 are stacking disposed, and provided a light source for supplying light to the liquid crystal display panel 200. Specifically, the backlight module 200 is provided closed to the side of the liquid crystal display panel on which the color filter substrate is provided.

In the description of the specification, reference to the terms "one embodiment", "some embodiments", "examples", "specific examples", "some examples" and the like is meant to refer to a particular feature described in connection with the embodiment or example, Structures, materials, or characteristics are included in at least one embodiment or example of the present invention. In the present specification, a schematic representation of the above terms does not necessarily refer to the same embodiment or example. Moreover, the particular features, structures, materials, or characteristics described may be combined in any one or more embodiments or examples in a suitable manner.

Above are embodiments of the present application, which does not limit the scope of the present application. Any modifications, equivalent replacements or improvements within the spirit and principles of the embodiment described above should be covered by the protected scope of the invention.

What is claimed is:

1. A liquid crystal display panel, comprising an antireflective film, a front polarizer, an array substrate, a liquid crystal layer, a color filter substrate, and a rear polarizer disposed sequentially, a metal trace is disposed on the array substrate and is directly contacted to the array substrate and the front polarizer, and the antireflective film completely covers the metal trace.

2. The liquid crystal display panel according to claim 1, wherein Magnesium Fluoride is selected as the material of the antireflective film.

3. The liquid crystal display panel according to claim 2, wherein Aluminum is used as the material of the metal trace, and the thickness of the antireflective film is 90.6~108.7 nm.

4. The liquid crystal display panel according to claim 3, wherein the thickness of the antireflective film is 97.8~101.4 nm.

5. The liquid crystal display panel according to claim 2, wherein Copper is used as the material of the metal trace, and the thickness of the antireflective film is 99.6~117.8 nm.

6. The liquid crystal display panel according to claim 5, wherein the thickness of the antireflective film is 105.1~108.7 nm.

7. The liquid crystal display panel according to claim 1, wherein the antireflective film completely covers surface of the array substrate.

8. The liquid crystal display panel according to claim 1, further comprising a COF structure of source, the COF structure of source is connected to the surface of the array substrate close to the liquid crystal layer, and the projection of the COF structure of source on the array substrate is within the array substrate.

9. The liquid crystal display panel according to claim 8, wherein one end of the COF structure of source is connected to the array substrate, and the COF structure of source is bent away from the direction of the array substrate to make the projection of the COF structure of source on the array substrate is within the array substrate.

10. A liquid crystal display comprising a backlight module and a liquid crystal display panel, the backlight module is disposed closed to the side of the liquid crystal display panel on which the color filter substrate is provided, the liquid crystal display panel comprising an antireflective film, a front polarizer, an array substrate, a liquid crystal layer, a color filter substrate, and a rear polarizer disposed sequentially, a metal trace is disposed on the array substrate and is directly contacted to the array substrate and the front polarizer, and the antireflective film completely covers the metal trace.

11. The liquid crystal display according to claim 10, wherein Magnesium Fluoride is selected as the material of the antireflective film.

12. The liquid crystal display according to claim 11, wherein Aluminum is used as the material of the metal trace, and the thickness of the antireflective film is 90.6~108.7 nm.

13. The liquid crystal display according to claim 12 wherein the thickness of the antireflective film is 97.8~101.4 nm.

14. The liquid crystal display according to claim 11, wherein Copper is used as the material of the metal trace, and the thickness of the antireflective film is 99.6~117.8 nm.

15. The liquid crystal display according to claim 14, wherein the thickness of the antireflective film is 105.1~108.7 nm.

16. The liquid crystal display according to claim 10, wherein the antireflective film completely covers surface of the array substrate.

17. The liquid crystal display according to claim 10, further comprising a COF structure of source, the COF structure of source is connected to the surface of the array substrate close to the liquid crystal layer, and the projection of the COF structure of source on the array substrate is within the array substrate.

18. The liquid crystal display according to claim 17, wherein one end of the COF structure of source is connected to the array substrate, and the COF structure of source is bent away from the direction of the array substrate to make the projection of the COF structure of source on the array substrate is within the array substrate.

\* \* \* \* \*